(12) United States Patent
Diab et al.

(10) Patent No.: US 7,966,502 B2
(45) Date of Patent: Jun. 21, 2011

(54) SYSTEM AND METHOD FOR ENABLING POWER OVER ETHERNET FOR LEGACY DEVICES

(75) Inventors: Wael William Diab, San Francisco, CA (US); Stephen Bailey, Portola Valley, CA (US)

(73) Assignee: Broadcom Corporation, Irvine, CA (US)

( * ) Notice: Subject to any disclaimer, the term of this patent is extended or adjusted under 35 U.S.C. 154(b) by 739 days.

(21) Appl. No.: 11/960,908

(22) Filed: Dec. 20, 2007

(65) Prior Publication Data

US 2009/0164805 A1    Jun. 25, 2009

(51) Int. Cl.
*G06F 1/26* (2006.01)
*G06F 1/18* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 7,203,849 B2 * | 4/2007 | Dove | ........... | 713/300 |
| 7,240,224 B1 * | 7/2007 | Biederman | ........... | 713/300 |
| 7,613,939 B2 * | 11/2009 | Karam et al. | ........... | 713/300 |
| 7,706,392 B2 * | 4/2010 | Ghoshal et al. | ........... | 370/419 |
| 7,761,719 B2 * | 7/2010 | Ghoshal et al. | ........... | 713/300 |
| 2006/0273661 A1 * | 12/2006 | Toebes et al. | ........... | 307/106 |
| 2007/0263675 A1 * | 11/2007 | Lum et al. | ........... | 370/910 |
| 2008/0005433 A1 | 1/2008 | Diab et al. | | |
| 2008/0005600 A1 | 1/2008 | Diab et al. | | |
| 2008/0005601 A1 | 1/2008 | Diab | | |
| 2008/0016263 A1 | 1/2008 | Diab et al. | | |

* cited by examiner

*Primary Examiner* — Thomas Lee
*Assistant Examiner* — Fahmida Rahman
(74) *Attorney, Agent, or Firm* — Duane S. Kobayashi (57) ABSTRACT

A system and method for enabling power over Ethernet (PoE) for legacy devices. Legacy devices often represent a large installed base of devices. This installed base of devices (e.g., mobile computing devices) may have little or no PoE functionality. It is a feature of the present invention that an external device (e.g., dongle) can be used to retrofit such an installed base of devices for use with state of the art PoE functionality.

22 Claims, 5 Drawing Sheets

SYSTEM AND METHOD FOR ENABLING POWER OVER ETHERNET FOR LEGACY DEVICES

BACKGROUND

1. Field of the Invention

The present invention relates generally to Power over Ethernet (PoE) and, more particularly, to a system and method for enabling PoE for legacy devices.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In the PoE process, a valid device detection is first performed. This detection process identifies whether or not it is connected to a valid device to ensure that power is not applied to non-PoE capable devices.

After a valid PD is discovered, the PSE can optionally perform a power classification. In a conventional 802.3af allocation, each PD would initially be assigned a 15.4 W power classification after a Layer 1 discovery process. An optional classification process could then reclassify the PD to a lower power level. In more complex PoE schemes, a Layer 2 classification engine can be used to reclassify the PD. Layer 2 classification processes can be included in PoE systems such as 802.3af, 802.3at or proprietary schemes. In general, Layer 2 communication (e.g., LLDP) can be used to enable a determination of an amount of power to be allocated to a PD. Where a PD such as a computing device has rapidly changing power needs, the Layer 2 communication can be used to transmit various power management information relevant to the PD's current or anticipated needs. Examples of such power management information include battery information, computing device component information, external device information, user information, application information, or the like.

Legacy computing devices (e.g., laptop computers) that have limited or no PoE functionality typically represent a large percentage of the installed base of devices. In rolling out PoE functionality into a corporate environment, the upgrading of the large installed base of legacy devices represents a prohibitive expense. What is needed therefore is a mechanism that enables PoE functionality for such legacy devices.

SUMMARY

A system and/or method for enabling PoE for legacy devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The deployment of power over Ethernet (PoE) systems in an enterprise environment is expected to produce significant benefits. By eliminating the reliance on AC power cords, devices can be flexibly deployed throughout the enterprise environment using a single Ethernet cable for connectivity. This flexibility in deployment also produces significant cost savings as excess electrical wiring, conduits, and outlets need not be installed.

As noted, one example of a device that can benefit from the installation of a PoE system is a computing device. In general, computing devices that are connected to enterprise networks are often connected on a non-permanent basis. For example, a corporate conference room can be designed with network cabling and corresponding power outlets to support the computing devices of 5-20 conference participants. With a PoE system installed, many of the power outlets can be eliminated as power can be alternatively supplied through the existing Ethernet connection.

Figure 1:
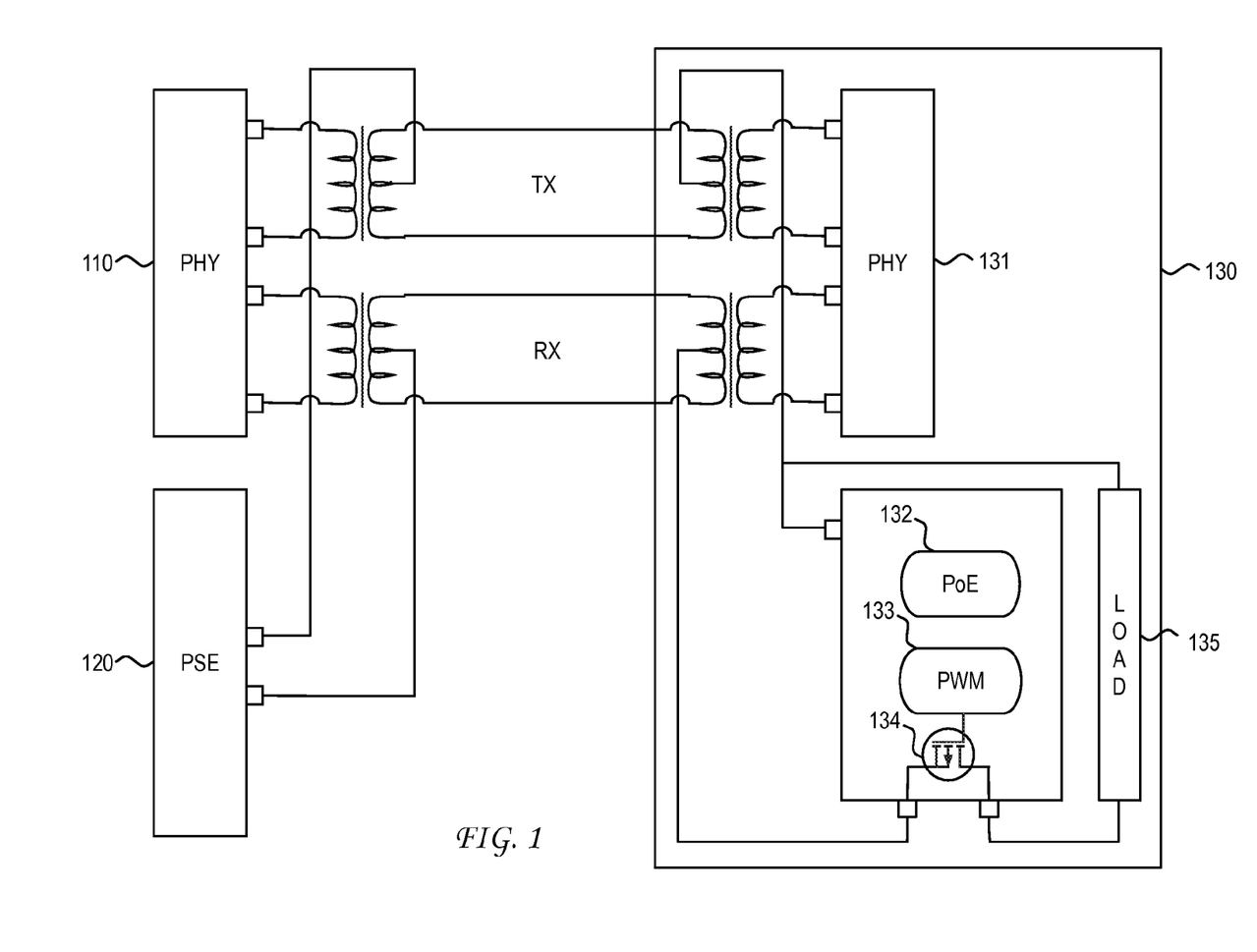
FIG. 1 illustrates an embodiment of a PoE system.

In realizing the benefits of a PoE system, a computing device would require the inclusion of certain PoE functionality. FIG. 1 illustrates those PoE elements that would enable a computing device to operate as a PD. As illustrated, the PoE system includes power sourcing equipment (PSE) 120 that transmits power to device 130. Power delivered by the PSE to device 130 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 131 in accordance with 10BASE-T, 100BASE-TX, 1000BASE-T, 10GBASE-T and/or any other layer 2 PHY technology.

As is further illustrated in FIG. 1, device 130 includes PoE module 132. PoE module 132 includes the electronics that would enable computing device 130 to communicate with PSE 120 in accordance with a PoE standard such as IEEE 802.3af, 802.3at, legacy PoE transmission, or any other type of PoE transmission. Device 130 also includes pulse width modulation (PWM) DC:DC controller 133 that controls power FET 134, which in turn provides constant power to load 135.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As would be appreciated, the incorporation of PoE elements 132, 133, 134 into an installed base of computing devices would be prohibitive. This is especially true when considering that the PoE functionality does not represent a core function of the computing device, but rather a measure of convenience for users. The principles of the present invention seek to address the need to accelerate the rollout of PoE functionality in a manner that does not require an overhaul of an installed base of devices.

Figure 2:
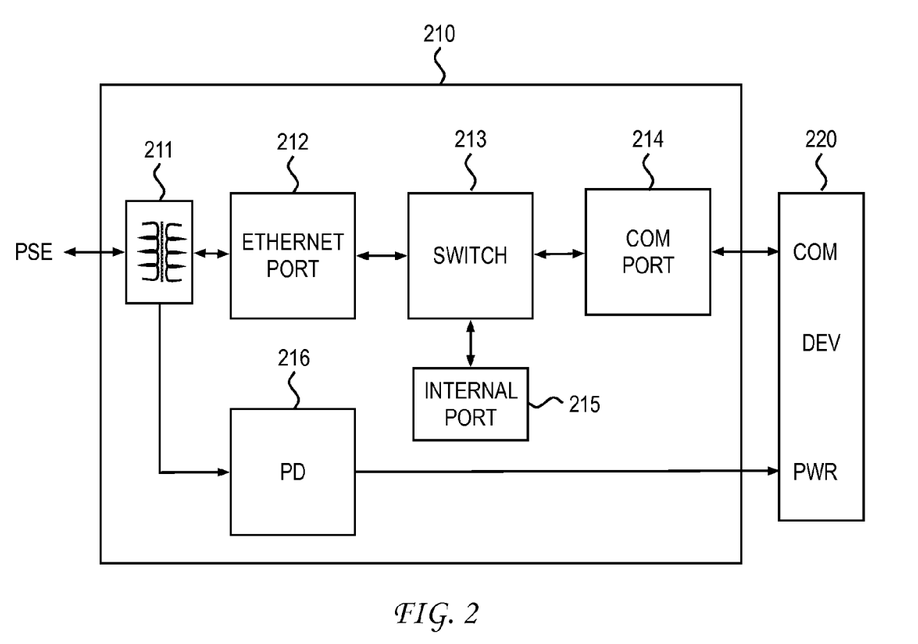
FIG. 2 illustrates an embodiment of a PoE accessory.

FIG. 2 illustrates an embodiment of an accessory 210 that can be used to enhance the PoE functionality of a device. In general, the device may have no PoE functionality resident therein, or could have a lower level of PoE functionality that is sought to be upgraded. Regardless of the level of PoE functionality of the device, the principles of the present invention can be used to enhance the level of PoE functionality in a low cost manner.

In general, accessory 210 is designed to provide an interface between a PSE and device 220, which needs upgraded PoE functionality. In the illustrated embodiment, accessory 210 includes transformers 211 designed to receive the wire pairs in an Ethernet cable. The TX and RX wire pairs are passed on to Ethernet port 212, while the center taps of transformers 211 are coupled to PD 216. As noted above, PD 216 can include a PoE module, which contains a signature detection component that enables detection by the PSE, a power controller that controls delivery of power received from the PSE, and circuitry that enables the relay of power demand information to the PSE (e.g., via Layer 2 communication). As illustrated, the resulting power that is extracted by PD 216 from the Ethernet link is forwarded to a power port on device 220. In one embodiment, the power port can represent a standard DC power input port on device 220.

In one embodiment, accessory 210 can be designed to simply produce a DC power output from an Ethernet input. No other communication port need be used. In one scenario, this embodiment can be used in those contexts where device 220 has no PoE functionality. For example, accessory 210 can be designed with basic 802.3af Layer 1 functionality that is designed to get as much power as possible from the PSE to deliver to device 220. In this example, accessory 210 need contain only transformers 211 and PD 216. In another example, accessory 210 can be designed with more advanced Layer 2 functionality to negotiate a power request on behalf of device 220. In this example, accessory 210 could be used to augment non-existent PoE functionality or primitive Layer 1 PoE functionality in device 220. To facilitate this type of functionality, accessory 210 would also include Ethernet port 212 and a processor (not shown) to perform the power request negotiation. In yet another example, accessory 210 can be applied to a legacy device that may already have basic two-pair PoE functionality (e.g., 802.3af). In this example, accessory 210 can be used to provide additional power via alternative pairs (e.g., 802.3at), wherein the additional amount of power can be modulated via Layer 2 communication.

In another embodiment, accessory 210 can be designed to support a communication connection with device 220 in addition to the power connection discussed above. To support the communication connection, accessory 210 also includes switch 213. In the illustrated embodiment, switch 213 is at least a three-port switch that can support Ethernet port 212, communication port 214, and internal port 215. Ports 212, 214, and 215 can support full duplex links such that traffic can be coming from either direction at the same time. Traffic can also be switched to two ports simultaneously. For example, internal port can add traffic to either or both of ports 212, 214, or receive traffic from either or both of ports 212, 214. In one example, traffic to/from Ethernet port 212 and internal port 215 can support PoE power request/priority negotiation between accessory 210 and the PSE, while traffic to/from internal port 215 and communication port 214 can support the exchange of power management information between accessory 210 and device 220.

Figure 3:
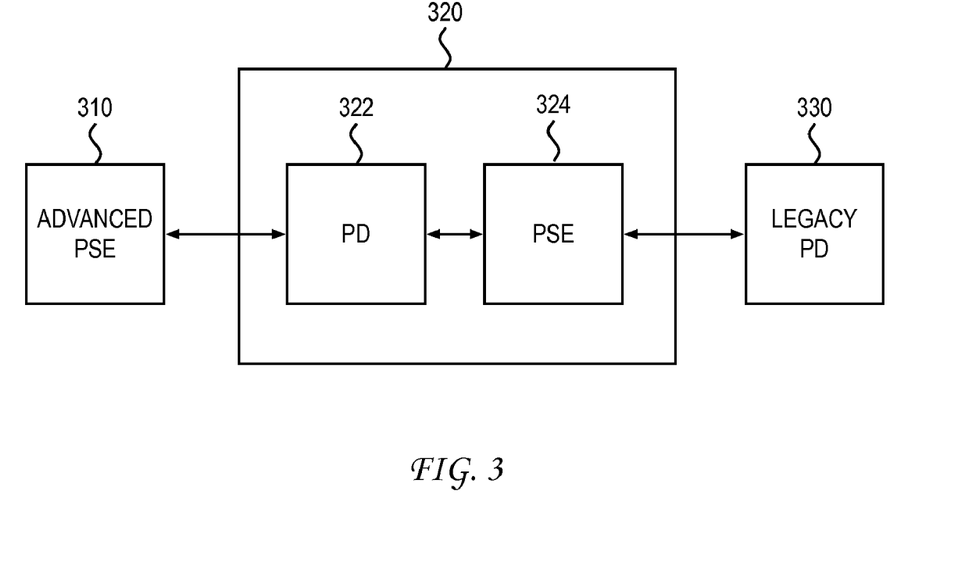
FIG. 3 illustrates another embodiment of a PoE accessory.

As noted, the principles of the present invention can also be applied to legacy PDs that lack Layer 2 communication. In the embodiment of FIG. 3, accessory 320 can incorporate PD 322 that faces an advanced (e.g., 802.3at) PSE 310, and PSE 324 that faces legacy (e.g., 802.3af) PD 330. Accessory 320 can then power PSE 324, initially requesting the power it detects on PD 330 via Layer 1, and requesting that amount of power from PSE 310 using PD 322. In one scenario, accessory 320 can then override the hardware classification of legacy PD 330 and provide the required dynamic power, which can be negotiated over the communication channel between accessory 320 and legacy PD 330, to advanced PSE 310 using PD 322.

In one embodiment, communication port 214 is an Ethernet port. In this embodiment, Ethernet traffic from the switch can be passed without modification from port 212 to port 214, and on to device 220. In other embodiments, communication port 214 can be embodied as a Bluetooth port, serial port, parallel port, USB port, or any other device-to-device communication mechanism.

As noted, communication port 214 can be used to support the exchange of power management information between accessory 210 and device 220. In one example, device 220 can be configured to provide accessory 210 with information that enables accessory 210 to determine the power needs of device 220. For example, device 220 can be configured to transmit parameters such as battery capacity, battery life, etc. that enables accessory 210 to make a priority decision based on a priority and allocation algorithm.

Figure 4:
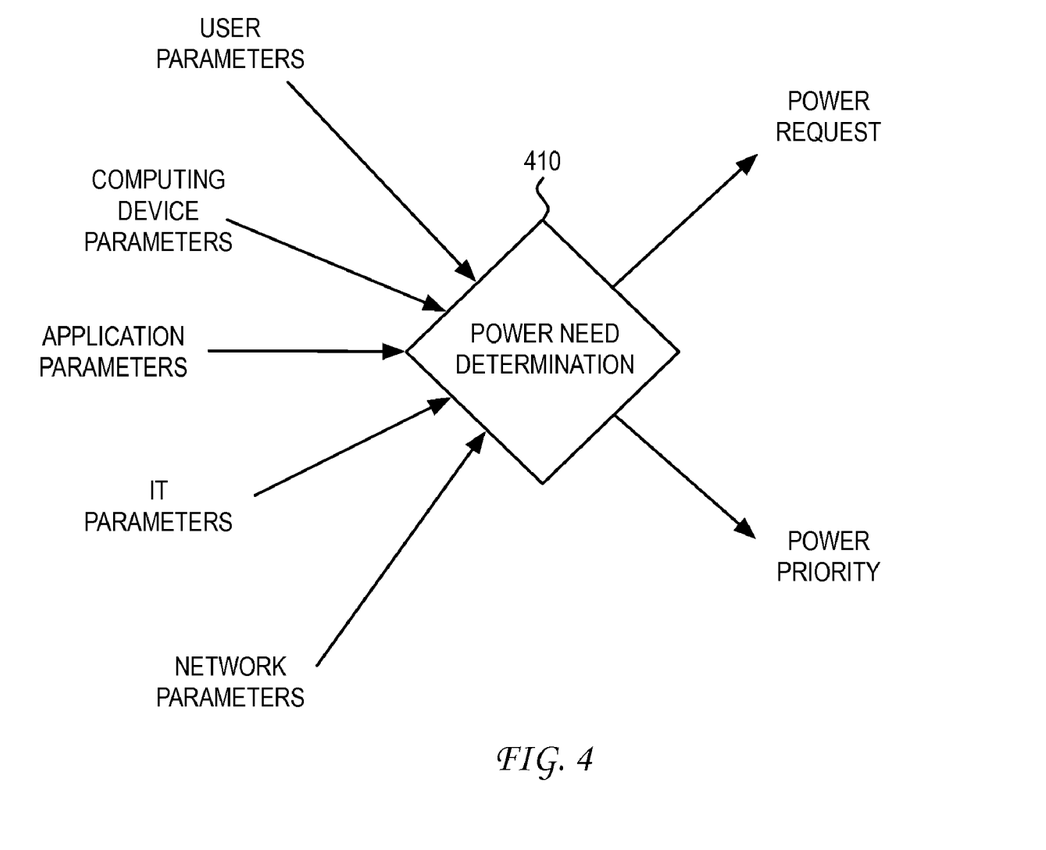
FIG. 4 illustrates an example mechanism of generating a power request and priority.

In another example, device 220 can be configured to perform a priority and allocation algorithm using parameters known to device 220. FIG. 4 illustrates an example of such a mechanism that can be implemented in software, hardware, and/or firmware. As illustrated, various power management information can be used as inputs to power need determination 410. In this example, the power management information includes user parameters (e.g., management, engineering, admin, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). With this set of power management information, power need determination 410 can then produce a power request and power priority for the device. This power request/priority information can then be communicated to accessory 210 for use in performing a power negotiation with the PSE. With this framework, device 220 plays a role in the PoE process, yet need not have the PoE hardware installed within. Device 220 can therefore leverage the various PSE deployments/upgrades without being reconfigured in hardware. Support for such PSE deployments/upgrades is enabled through the functionality of accessory 210.

To further illustrate the features of the present invention, reference is now made to the flowchart of FIG. 45. As illustrated, the process of FIG. 5 begins at step 502 where the PoE accessory is attached to a device needing PoE enhancement. In one example, the attachment is based solely on a DC power connection. In another example, the attachment is based on a DC power connection and a communication connection (e.g., Ethernet, Bluetooth, serial, parallel, USB, etc.). At step 504 the accessory is then coupled to a PSE via an Ethernet cable.

Figure 5:
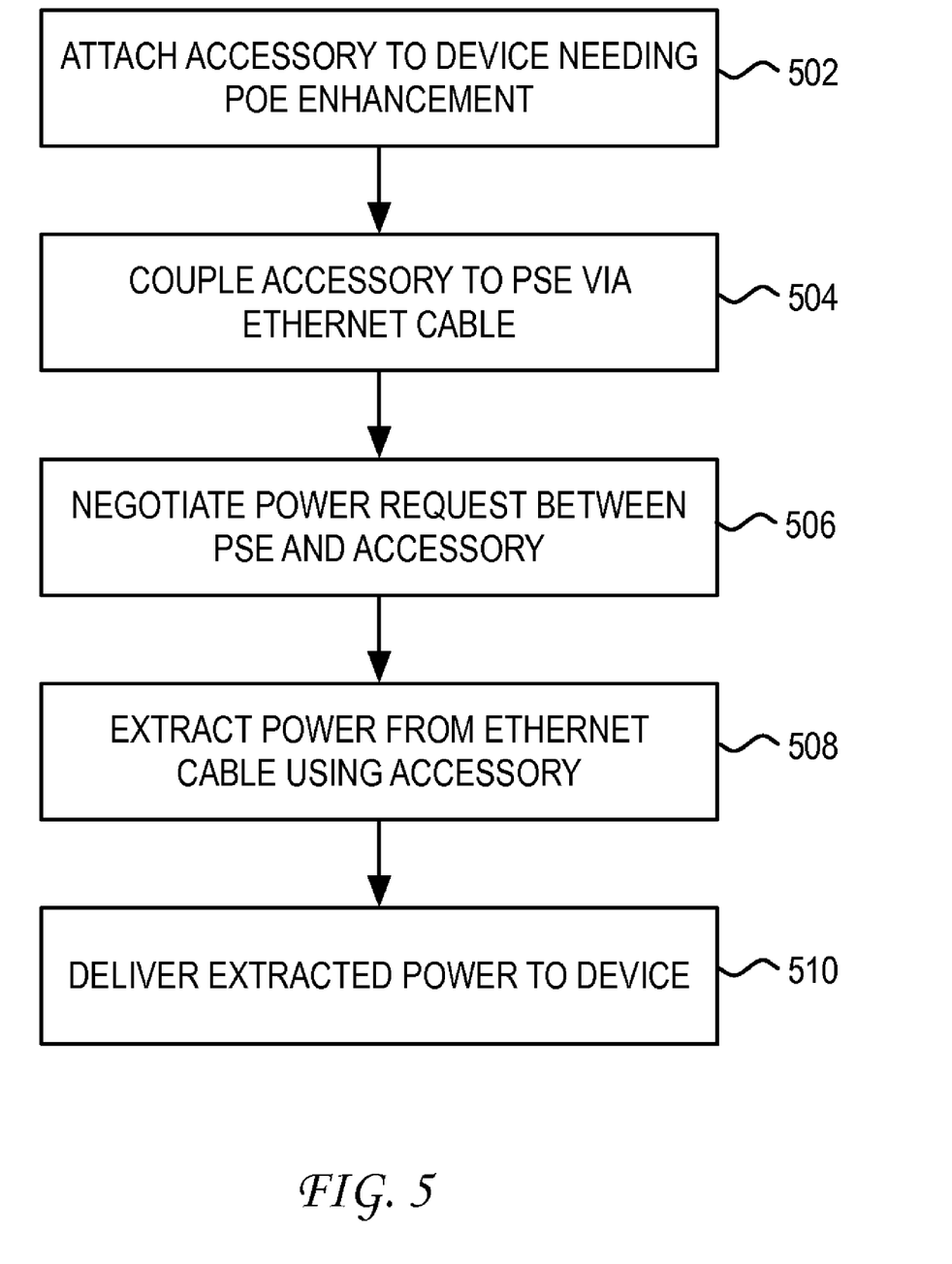
FIG. 5 illustrates a flowchart of a process of enabling PoE for legacy devices.

The positioning of the accessory between the PSE and the device enables the accessory to act as a PD on behalf of the device. In other words, the accessory can be detected as a PD using the signature detection component incorporated within the accessory. Upon detection of the accessory as a PD, the accessory can then negotiate a power request on behalf of the device at step 506. In one embodiment, the accessory can negotiate the power request independently of the device. In this embodiment, the accessory can request the maximum allowed power that is available from the PSE. Whatever amount of power that is approved can then be transferred to the device using the DC power connection. In another embodiment, the accessory can negotiate the power request using input from the device. In one example, the device can forward power management parameters to the accessory for determination of a power request/priority. In another example, the device can determine the power request/priority using various power management information available to the device, and forward the determined power request/priority to the accessory. Regardless of the type or amount of input that is provided by the device to the accessory, the accessory represents a low-cost mechanism of leveraging new or upgraded PoE capabilities of the PSE without requiring commensurate upgrades at the device.

At step 508, after the accessory has negotiated the power request on behalf of the device, the accessory can then extract power that is delivered to the accessory via the Ethernet cable. The power is extracted using the power controller and power FET in the accessory and delivered to the device at step 510 using the DC power connection.

As has been described, the accessory of the present invention can provide the benefits of the latest PoE technologies to any type of device that needs power. These benefits can be realized without requiring a hardware upgrade of the device. Specifically, any device that has an external DC power port can potentially benefit from the principles of the present invention.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method, comprising:
    coupling a first power of Ethernet device to a second power over Ethernet device, wherein said first power over Ethernet device has a first level of power over Ethernet capability that enables a receipt of power over four wire pairs, and said second power over Ethernet device has a second level of power over Ethernet capability that is limited to receiving power over two wire pairs;
    coupling said first power over Ethernet device to a power sourcing equipment via an Ethernet cable; and
    communicating, by said first power over Ethernet device, power over Ethernet power requests to said power sourcing equipment on behalf of said second power over Ethernet device, thereby augmenting the power over Ethernet capability of said second power over Ethernet device.

2. The method of claim 1, wherein said first power over Ethernet device is coupled to said second power over Ethernet device through a power port.

3. The method of claim 1, wherein said first power over Ethernet device is coupled to said second power over Ethernet device through a power port and a communication port.

4. The method of claim 3, wherein said communication port is an Ethernet port.

5. The method of claim 1, wherein said communicating is via Layer 2 messaging.

6. The method of claim 1, wherein said communicating is based on processing in said first power over Ethernet device.

7. A power over Ethernet accessory device that is positioned between a power sourcing equipment and a powered device, and provides dynamic power to the powered device, comprising:
    a power sourcing equipment module that negotiates a first power request with the powered device, wherein said first power request is negotiating using Layer 1 communication; and
    a powered device module that negotiates a second power request, based on said first power request, with the power sourcing equipment on behalf of the powered device, wherein said second power request is negotiated using Layer 2 communication, wherein the powered device does not support power over Ethernet Layer 2 communication.

8. The power over Ethernet accessory device of claim 7, wherein said second power request overrides a classification presented by hardware components in the powered device.

9. A power over Ethernet method, comprising:
    coupling a power over Ethernet device to a first port of a second device, said first port being used to deliver power from said power over Ethernet device to said second device;
    coupling said power over Ethernet device to a second port of said second device, said second port being separate from said first port and being used to deliver power management information from said second device to said power over Ethernet device;
    coupling said power over Ethernet device to a power sourcing equipment via an Ethernet cable;
    communicating, by said power over Ethernet device using Layer 2 communication, a power over Ethernet power request to said power sourcing equipment on behalf of said second device, said power over Ethernet power request being based on power management information received from said second device via said second port; and
    delivering, by said power over Ethernet device, power received over said Ethernet cable in response to said power over Ethernet power request to said first port of said second device.

10. The method of claim 9, wherein said second port is an Ethernet port.

11. The method of claim 9, wherein said communicating is based on processing in said power over Ethernet device.

12. The method of claim 9, wherein said first port is used only to deliver power.

13. The method of claim 9, wherein said coupling comprises coupling a dongle to said second device.

14. A power over Ethernet method, comprising:
coupling a power over Ethernet device to a first port of a second device, said first port being used to deliver power from said power over Ethernet device to said second device;
coupling said power over Ethernet device to a second port of said second device, said second port being separate from said first port and being used to deliver power management information from said second device to said power over Ethernet device;
negotiating, by said power over Ethernet device with a power sourcing equipment, an amount of power to be delivered to said second device via said power over Ethernet device, wherein said negotiating by said power over Ethernet device is based on said power management information received from said second device via said second port;
extracting, by said power over Ethernet device, power delivered via an Ethernet cable coupling said power sourcing equipment and said power over Ethernet device; and
delivering, by said power over Ethernet device, said extracted power to said first port of said second device.

15. The method of claim 14, wherein said negotiating comprises negotiating using Layer 1 communication.

16. The method of claim 14, wherein said negotiating comprises negotiating using Layer 2 communication.

17. The method of claim 14, wherein said extracting comprises extracting using a power controller in said power over Ethernet device.

18. A power over Ethernet device that delivers power to a second device that is not equipped to receive power from a network via a network cable, comprising:
a power delivery port coupled to the second device;
an Ethernet physical layer device that is coupled to a power sourcing equipment over an Ethernet link;
a signature detection component that enables detection of the power over Ethernet device by said power sourcing equipment;
a switch having a first external port coupled to said Ethernet physical layer device, a second external port coupled to the second device via a communication port that is separate from said power delivery port, and an internal port used by the power over Ethernet device; and
a power controller that controls a delivery of power received from said power sourcing equipment to the second device via said power delivery port.

19. The power over Ethernet device of claim 18, wherein said second external port is coupled to a second Ethernet physical layer device.

20. The power over Ethernet device of claim 18, wherein said second external port is coupled to one of a Bluetooth, parallel port, serial port, or USB port device.

21. The power over Ethernet device of claim 18, further comprising a processor that performs Layer 2 power negotiation with said power sourcing equipment.

22. The power over Ethernet device of claim 18, wherein the power over Ethernet device is implemented as a dongle.

* * * * *

UNITED STATES PATENT AND TRADEMARK OFFICE
CERTIFICATE OF CORRECTION

| | | |
|---|---|---|
| PATENT NO. | : 7,966,502 B2 | Page 1 of 1 |
| APPLICATION NO. | : 11/960908 | |
| DATED | : June 21, 2011 | |
| INVENTOR(S) | : Wael William Diab and Stephen Bailey | |

It is certified that error appears in the above-identified patent and that said Letters Patent is hereby corrected as shown below:

Col. 5, Claim 1, line 2, replace "of" with --over--.

Col. 6, Claim 7, line 7, replace "negotiating" with --negotiated--.

Signed and Sealed this
Ninth Day of August, 2011

David J. Kappos
*Director of the United States Patent and Trademark Office*